United States Patent [19]

Payne

[11] Patent Number: 4,579,670

[45] Date of Patent: Apr. 1, 1986

[54] CONTROL OF CROSSLINKING REACTION RATE OF AQUEOUS FRACTURING FLUIDS

[75] Inventor: Kathryn L. Payne, Houston, Tex.

[73] Assignee: Big Three Industries, Inc., Houston, Tex.

[21] Appl. No.: 593,377

[22] Filed: Mar. 26, 1984

[51] Int. Cl.[4] ................. B01J 13/00; C09K 3/00; E21B 43/26
[52] U.S. Cl. ................. 252/8.55 R; 166/308; 252/315.3
[58] Field of Search ............. 252/8.55 R, 315.3; 166/308

[56] References Cited

U.S. PATENT DOCUMENTS

| | | | |
|---|---|---|---|
| 2,955,753 | 5/1957 | O'Conor et al. | 233/4 |
| 3,036,214 | 11/1955 | Forni et al. | 250/43.5 |
| 3,251,781 | 5/1966 | Jordan | 252/316 |
| 3,615,794 | 10/1971 | Nimerick | 106/208 |
| 3,898,165 | 8/1975 | Ely et al. | 252/8.55 R |
| 3,974,077 | 8/1976 | Free | 252/8.55 R |
| 4,021,355 | 5/1977 | Holtmyer et al. | 252/8.55 R |
| 4,033,415 | 7/1977 | Holtmyer et al. | 166/308 |
| 4,040,484 | 8/1977 | Hessert | 166/294 |
| 4,071,467 | 1/1978 | Nordgren | 252/316 |
| 4,110,230 | 8/1978 | Hessert | 252/8.55 R |
| 4,210,106 | 7/1980 | Ely et al. | 166/294 |
| 4,259,205 | 3/1981 | Murphey | 252/326 |
| 4,272,384 | 6/1981 | Martin | 252/8.55 R |
| 4,460,751 | 7/1984 | Hanlon | 525/371 |
| 4,464,270 | 8/1984 | Hollenbeak | 252/8.55 R |
| 4,470,915 | 9/1984 | Conway | 252/8.55 R |
| 4,477,360 | 10/1984 | Almond | 252/8.55 R |
| 4,502,967 | 3/1985 | Conway | 252/8.55 R |

FOREIGN PATENT DOCUMENTS 2106958 4/1983 United Kingdom .
2108122 5/1983 United Kingdom .

Primary Examiner—Dennis L. Albrecht
Attorney, Agent, or Firm—Pravel, Gambrell, Hewitt & Kimball

[57] ABSTRACT

A method of controlling crosslinking reaction rate in a water based polymer fracturing fluid that involves using a mixture of a crosslinker, in combination with a crosslinking rate accelerator or a crosslinking rate retarder at a ratio such that the crosslinking reaction rate is controlled. This decreases the shear effects upon the polymer fracturing fluid during pumping which affects downhole stability of the fluid and decreases pumping and frictional pressures. The ratio of rate accelerator or rate retarder to crosslinker for a desired crosslinking reaction time is dependent upon pH, surface temperature, polymer concentration, salt concentrations, fluid loss additives, surfactant types and concentrations, mutual solvents and alcohol. The preferred polymer fracturing fluid is a high pH aqueous salt solution including a hydroxypropyl guar polymer. The preferred crosslinkers are transition metal chelates. The preferred crosslinking rate accelerators are polyamines. The preferred crosslinking reaction rate retarders are glyoxal and triethanolamine. Batch mixing of the polymeric fracturing fluid, crosslinker and rate accelerator or rate retarder is possible; however in the preferred embodiment the crosslinker and accelerator or retarder are injected simultaneously with the polymeric fracturing fluid so that the crosslinking reaction rate can be continuously adjusted in response to changing conditions.

18 Claims, 6 Drawing Figures

CONTROL OF CROSSLINKING REACTION RATE OF AQUEOUS FRACTURING FLUIDS

BACKGROUND OF THE INVENTION

The present invention relates to a method of controlling the crosslinking reaction rate in water-based fracturing fluids. It more particularly relates to chemical additives which may be applied to a fracturing fluid system in such a manner as to either accelerate or retard the crosslinking reaction.

DESCRIPTION OF PRIOR ART

The intent of hydraulic fracturing used for well stimulation is to increase well productivity by creating a highly conductive path (relative to formation permeability) through which hydrocarbons may flow. The fracture is initiated by pumping a suitable fluid, with or without proppant suspended therein, into the formation at a sufficient rate to overcome the earth's compressive forces.

As injection of a fracturing fluid containing a propping agent continues, the proppant is placed within the fractured zone. After completion of the fracturing treatment, the fluid is recovered from the formation and the proppant remains to hold the fracture faces apart.

The use of fracturing fluids having relatively high viscosities is advantageous because such fluids readily support and place proppant particles. However, the injection of highly viscous fluids is frequently hindered by excessive friction losses encountered during the introduction of the fluid to the wellbore. Generally, a fracturing fluid is pumped into a wellbore through a conduit, such as tubing or casing which may range from $2\frac{7}{8}$ to 7 inches in diameter. The pumping equipment and tubular goods are limited by specific safety and pressure requirements which can be prohibitive. That is, the wellhead pressure and hydraulic horsepower required to overcome friction loss may necessitate more pump capacity and/or tubular strength than are available. Consequently, a fracturing fluid of desirably high viscosity often cannot be injected at a sufficient rate to effectively open a fracture.

In conventional hydraulic fracturing in applications where high viscosity is desired, crosslinking compounds are mixed with aqueous solutions containing hydratable polysaccharides such as galactomannan gums, glucomannan gums, and cellulose derivatives. Most appropriate crosslinking compounds provide metal ions which crosslink polymer strands through available ionic sites. Crosslinking can occur through hydroxy, amino, amido, carboxyl, and thio groups although the hydroxy crosslinking reaction occurs most readily. The crosslinking reaction of a common guar gum derivative such as hydroxypropyl guar with a frequently used crosslinking agent like triethanolamine titanate generally occurs within seconds. This reaction increases viscosity by several orders of magnitude causing a correlated increase in friction pressure. Furthermore, pumping extremely viscous fracturing fluids results in undesirable shear of the crosslinked fluid. A disruption of the crosslinked structure often reduces the downhole stability of the crosslinked gel.

SUMMARY OF THE INVENTION

The present invention provides a means by which friction loss problems and excessive shear of the crosslinked fluid are overcome.

According to the present invention, a crosslinked fracturing fluid is provided that yields an ultimate crosslinked gel viscosity in the range of 5,000 to 100,000 centipoises which develops gradually over a period of time. The period of time required to reach the viscosity range stated above is hereinafter referred to as the crosslinking time or crosslinking reaction rate. Crosslinking times can be designed such that the viscosity develops at any point between 0.01 minutes and 60 minutes. The crosslinking times are controlled through the addition of chemical components which either accelerate or retard the crosslinking reaction rate.

It is an object of the present invention to provide a chemical method for controlling the crosslinking reaction time so as to decrease horsepower requirements, decrease the friction pressures, and to minimize the shear force effects during pumping upon a fracturing fluid in the crosslinked state.

It is an object of the present invention to provide a method by which the crosslinking reaction time may be specified and achieved within seconds after addition of the crosslinking agent, or at some point following crosslinker injection but prior to entry into the casing or tubing, or at some point following entry into the tubing or casing but prior to entry into the formation. Likewise, crosslink times may be controlled so that crosslinked gel viscosity is achieved as the fracturing fluid enters the formation or after entering the fractured zone.

The composition of the above mentioned crosslinked fracturing fluid includes a hydratable polysaccharide in aqueous solution, a transition metal chelate crosslinking initiator, and a crosslinking rate controller which is either a rate accelerator or a rate retarder.

The composition may be prepared by mixing a predetermined quantity of the hydratable polysaccharide gellant with a given quantity of aqueous liquid. Any suitable batch mixing apparatus may be used for this mixing procedure. For batch mixing, the gelling agent and aqueous liquid should be blended for a period of time which is sufficient to form a hydrated gel. Once the hydration of the gelling agent is complete, a predetermined quantity of crosslinking agent is mixed with the hydrated gel simultaneously with a quantity of crosslinking rate controller sufficient to achieve a desired crosslinking reaction time. The mixture is pumped into the wellbore as the crosslinking reaction takes place. Propping agents are generally added to the hydrated gel prior to the addition of the crosslinking agent as the fracturing fluid is pumped into the wellbore.

An alternative mixing procedure involves continuously adding the gellant, pH control agents, surfactants, crosslinking agent, crosslinking rate controller, and/or any other additives included in the fluid design while pumping the fluid into the wellbore. In the continuous mixing process, both gellant hydration and crosslinking occur as the fluid is pumped.

The rate at which the crosslinking reaction occurs depends on the quantity of rate accelerator or rate retarder employed. The concentration of the crosslinking rate accelerator or the crosslinking rate retarder is continuously controlled to respond to changes in conditions that affect the crosslinking reaction. Examples of such conditions or variables which might affect crosslinking reaction time are surface temperature, polymer concentrations, salt concentrations, buffer types and concentrations, surfactant types and concentrations, fluid loss additives, mutual solvents, alcohol, and pH.

DETAILED DESCRIPTION OF THE INVENTION

Figure 1:
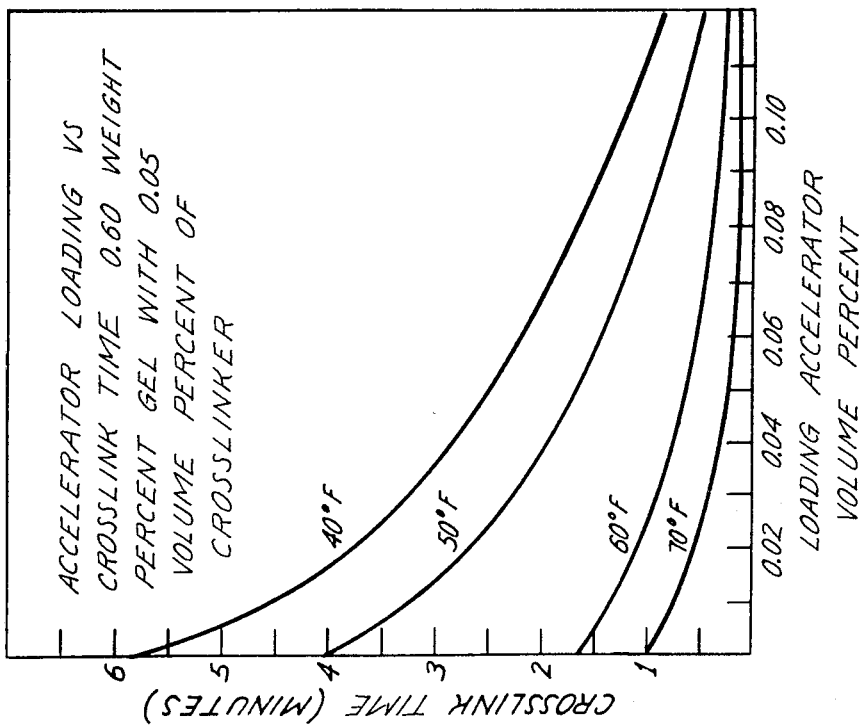
FIG. 1 is a graph of accelerator loading versus crosslinking reaction times for a fracturing fluid containing 0.48 weight percent gelling agent and 0.04 volume percent crosslinker.

The aqueous liquid described herein is used to solvate the gelling agent prior to crosslinking. It may contain various additives common to the well services industry such as alcohol, surfactants, pH-control agents, biocides, oxygen scavengers, and salts.

Appropriate gellants for the present invention include hydratable polysaccharides such as the galactomannan gums, glucomannan gums, and cellulose derivatives. Suitable polysaccharides include guar gum, cationically substituted guar, hydroxypropyl guar, carboxymethyl hydroxypropyl guar, hydroxybutyl guar, carboxymethyl cellulose, carboxymethyl hydroxyethyl cellulose, and hydroxyethyl cellulose. The preferred gelling agents are guar gum, hydroxypropyl guar, carboxymethyl hydroxypropyl guar, cationic guar and carboxymethyl hydroxyethyl cellulose. The most preferred gellant for the present invention is hydroxypropyl guar.

The gelling agent should be added to the aqueous liquid in concentrations ranging from 0.30% to 2.00% by weight of the aqueous liquid. The most preferred range for the present invention is 0.36% to 0.72% by weight.

The pH of the aqueous liquid or aqueous liquid/polysaccharide mixture may be adjusted to a desired level by acids, acid buffers, mixtures thereof, or mixtures of acids and bases. Typical examples of chemicals used for the purpose of adjusting pH include hydrochloric acid, fumaric acid, acetic acid, adipic acid, potassium biphthalate, sodium hydrogen fumarate, sodium acetate, sodium diacetate, sodium dihydrogen citrate, ammonium acetate, sodium bicarbonate and sodium carbonate. Control of the crosslinking reaction rate may be accomplished over a broad pH range, however, the preferred pH range for the present invention is from about 7 to about 13.

Crosslinking compounds may include any compound which provides a transition metal such a titanium, zirconium, chromium or hafnium. The most applicable crosslinkers are complex ions such as tetramethyl orthotitanate, tetraethyl titanate, tetrapropyl titanate, tetrapropyl zirconate, and tetrabutyl zirconate which are made water-soluble by various ligands including $\beta$-diketo compounds, alkanolamines, hydroxylamines, ethoxylated alcohols, lactones, and polyacrylic acids. More specific examples are triethanolamine, acetic acid, tartaric acid, carbon dioxide, nitric acid, acetyl acetonate, and lactic acid. The amount of crosslinking agent necessary to form crosslinked fracturing fluids in the present invention varies from about 0.005% to about 0.5% by volume of the aqueous liquid/polysaccharide mixture. The preferred crosslinker concentration ranges from about 0.03% to about 0.07% by volume of the aqueous mixture.

In the present invention, the crosslinking reaction can either be accelerated or retarded through the addition of crosslinking rate accelerators or crosslinking rate retarders to the fracturing fluid with the crosslinker as will be more fully described hereinbelow. Preferably the crosslinker and rate accelerator or rate retarder are injected simultaneously with the introduction of the fracturing fluid into the wellbore at the surface, so that the concentrations can be adjusted in response to fluid variables and/or changing surface conditions.

Many hydraulic fracturing operations involve fluids having different gellant loadings, buffers, salt contents, surfactants, and oxygen scavengers which can cause changes in crosslinking rates. In the practice of the present invention, variations in crosslinking reaction times due to fluid variations can be controlled through the injection of a predetermined quantity of a crosslinker and a rate accelerator or rate retarder in concentrations which are adjusted for such changing conditions so that a desired crosslinking reaction time can be maintained.

The crosslinking rate accelerators or rate retarders can also be batch mixed with the fracturing fluid or blended directly with the crosslinking agent prior to injection of the fluid. However, batch-mixing crosslinking rate controllers or premixing crosslinker/accelerator or crosslinker/retarder blends do not provide the flexibility that the simultaneous injection of crosslinker and accelerator or retarder does. Batch-mix processes and premixed blends generally necessitate estimating a desired crosslinking reaction time prior to pumping. In batch-mixing procedures, the quantity of rate accelerator or rate retarder may vary according to the aforementioned fluid variables. Consequently, the required amount of the crosslinking rate controller must be determined for each individual tank of fracturing fluid and the addition of that amount must be meticulously controlled. After rate controller has been added, any unforeseen changes in fluid conditions other than fluid composition such as changes in surface temperature, viscosity or pH can cause corresponding variations in crosslinking reaction times.

Crosslinker/rate controller blends must also be mixed before injection of the fracturing fluid. A desired crosslinking time is chosen and either one crosslinker/rate controller blend is prepared which provides an average crosslinking reaction time over a range of fluid variables or several blends are prepared to compensate for changes in fluid composition. Again unforeseen changes in fluid conditions can cause changes in crosslinking times for which compensation is difficult after crosslinker/rate controller blends have been prepared.

Due to the difficulties in the application of batch-mixed processes and crosslinker/rate controller blends, it is preferable in the practice of the present invention to deliver the crosslinking agent and crosslinking rate controller simultaneously while pumping the fracturing fluid into the wellbore. By simultaneously injecting the two components, the crosslinking reaction rate can be monitored throughout the fracturing operation and the quantity of rate controller may be altered if necessary to compensate for changing conditions.

The rate of the crosslinking reaction is accelerated by the addition of polyamines. Suitable polyamines for accelerating the crosslinking time include tetramethylenediamine, triethylenetetramine, tetraethylenepentamine, diethylenetriamine, triethylenediamine, triethylenepentamine, N, N'-diethyl-1,4-pentanediamine, ethylenediamine, N,N'-diethyl ethylenediamine, 1,5,9,13-tetraazatridecane, 1,5,8,12 tetraazadodecane, and hexamethylenediamine. These and similar polyamines may be utilized in concentrated form or may be diluted with a suitable solvent such as water or alcohol. The crosslinking rate accelerator is used at a sufficient loading level to achieve the desired crosslinking rate. Loading levels can vary according to the temperature, gellant concentration, pH, salt content, and other aforementioned variables. Typical loadings for a concentrated crosslinking rate accelerator range from about 0.001% to about 0.6% by volume of the fracturing treatment fluid.

The rate of the crosslinking reaction is slowed by the addition of various rate retarders. Suitable rate retarders include triethanolamine, sorbitol, mannitol, ethylene glycol, glycerin, and glyoxal. The preferred crosslinking rate retarders for the present invention are glyoxal and triethanolamine. Crosslinking rate retarders may be added in conjunction with a crosslinking agent according to the procedure described hereinabove during the fracturing operation.

Crosslinking rate retarders can be used in concentrated or dilute forms. Solids such as sorbitol or mannitol may be batch mixed in solid form or may be dissolved in water and added as an aqueous solution. Sorbitol and mannitol must be in aqueous solution for use in crosslinker/rate retarder blends for simultaneous injection procedures. The preferred concentrations of sorbitol or mannitol in aqueous solutions range from about 10% to about 20% by weight.

The preferred crosslinking rate retarders, glyoxal and triethanolamine, are typically used in concentrations ranging from about 0.001% to about 0.6% by volume of the fracturing fluid. For ease of handling, these rate retarders may be diluted with suitable solvents such as water or alcohol.

Figure 2:
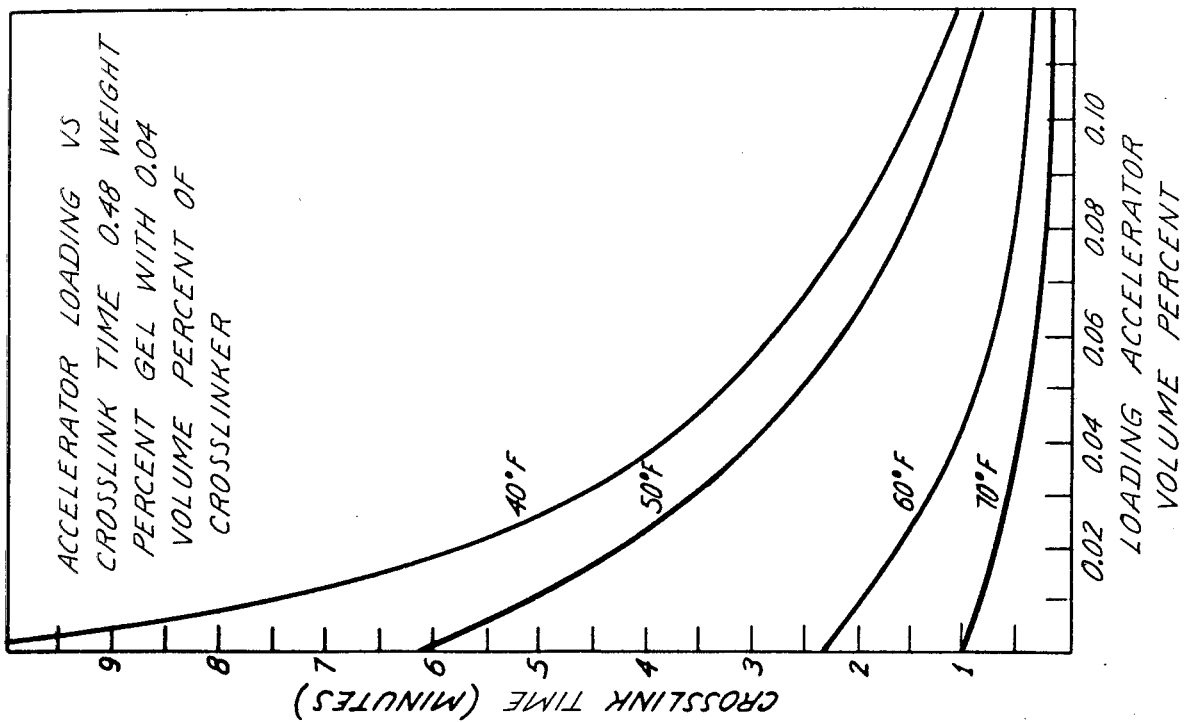
FIG. 2 is a graph of accelerator loading versus crosslinking times for a fluid containing 0.60 weight percent gellant and 0.05 volume percent crosslinking agent.
Figure 3:
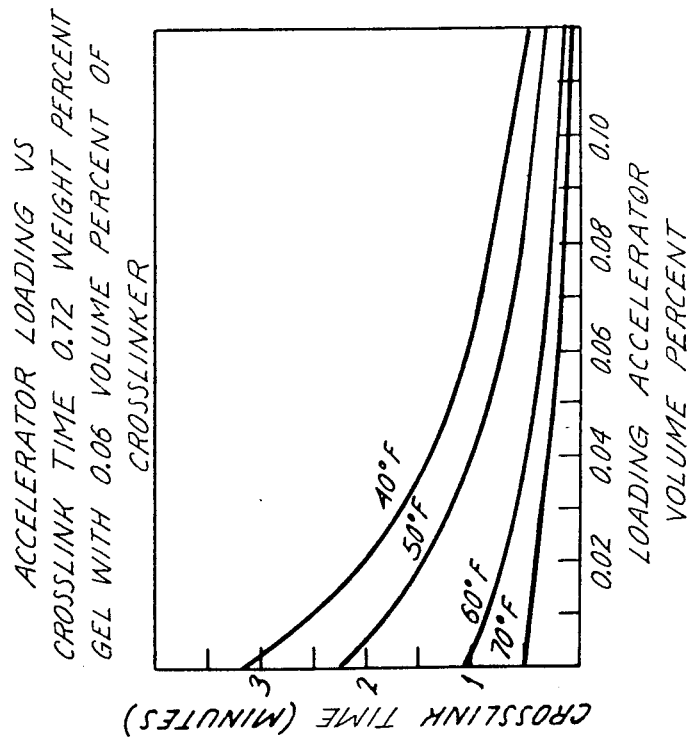
FIG. 3 is a graph of accelerator loading versus crosslinking times for fracturing fluids containing 0.72 weight percent gellant and 0.06 percent crosslinking agent.

FIGS. 1, 2, and 3 show the acceleration of crosslinking times in fracturing fluids respectively containing 0.48 percent, 0.60 percent, and 0.72 percent gelling agent by weight as the loading of crosslinking rate accelerator is increased. The graphs are representative of the trends in crosslinking times given by aqueous solutions of the previously listed polyamines wherein 45% by volume of the dilute solution is a polyamine.

The differences in crosslinking times at various temperature levels are made evident by separate curves representing crosslinking reation times at 40° F., 50° F., 60° F., and 70° F. with increasing volume increments of a rate accelerator. A comparative study of FIGS. 1, 2 and 3 also displays the shifts in crosslinking times caused by changes in gellant and crosslinker loadings.

Figure 4:
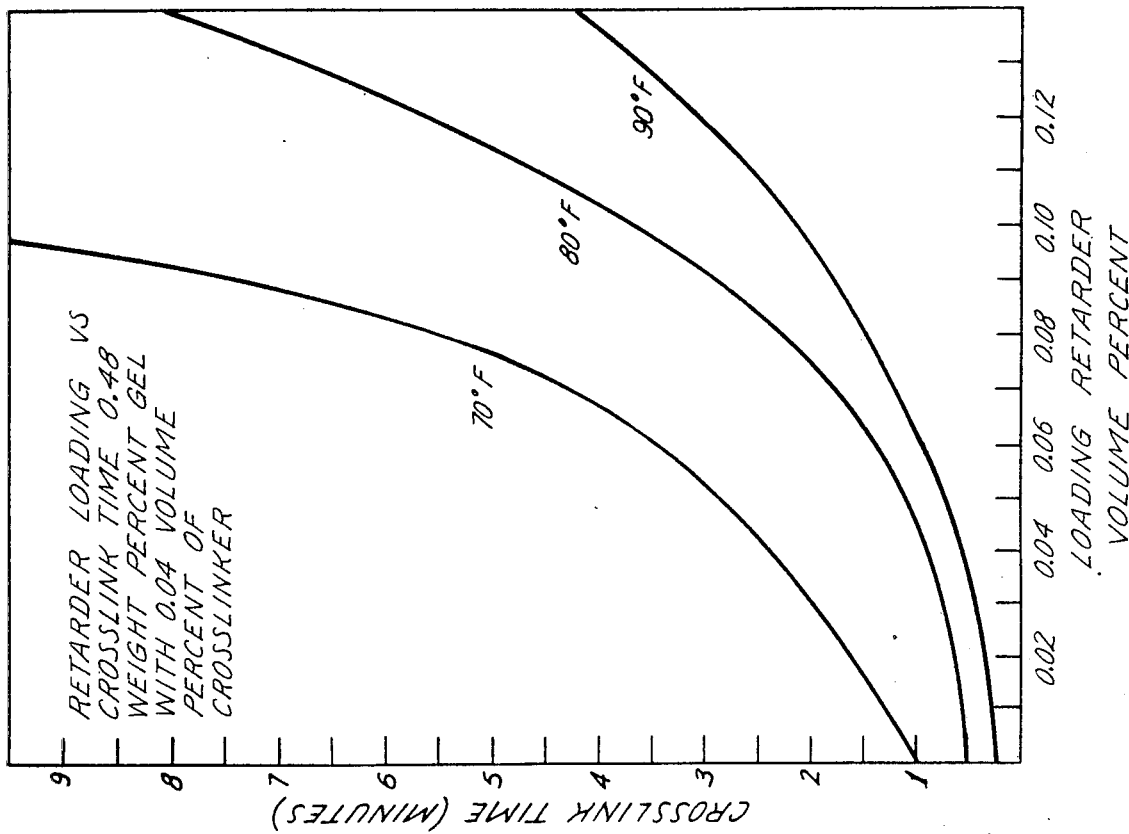
FIG. 4 is a graph of retarder loading versus crosslinking reaction time for a fracturing fluid containing 0.48 weight percent gellant and 0.04 volume percent crosslinking agent.
Figure 6:
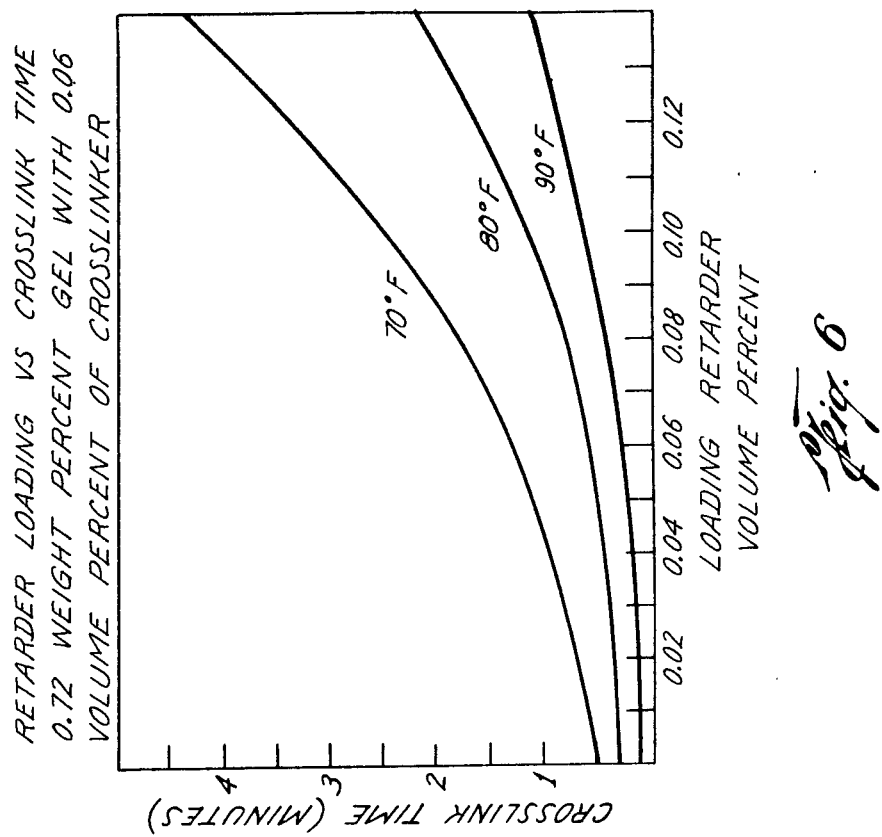
FIG. 6 is a graph of retarder loading versus crosslinking times for a fluid containing 0.72 weight percent gellant and 0.06 volume percent crosslinking agent.
Figure 5:
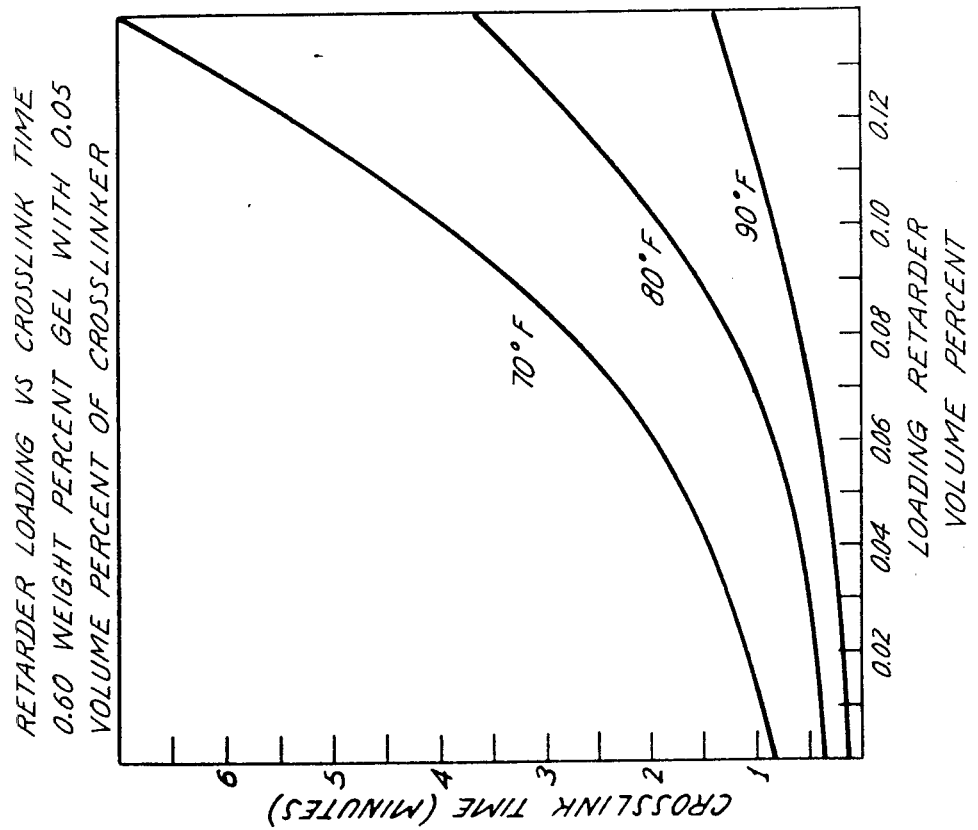
FIG. 5 is a graph of retarder loading versus crosslinker reaction time for a gel containing 0.60 weight percent gelling agent and 0.05 volume percent crosslinker.

FIGS. 4, 5 and 6 show the extension of crosslinking times in fracturing fluids respectively containing 0.48 percent, 0.60 percent, and 0.72 percent gellant by weight as the loading of a crosslinking rate retarder is increased. The graphs are representative of the trends given by aqueous solutions of the aforementioned cross-link retarding chemicals.

The shifts in crosslinking reaction times caused by temperature changes are displayed by separate curves representing the data gathered at 70° F., 80° F., and 90° F.

It shoud be understood that the foregoing description is not intended to be limiting but is only exemplary of the inventive features which are defined in the claims.

What is claimed is:

1. A composition of matter which initiates a time controlled crosslinking reaction aqueous hydratable polysaccharide fracturing fluid, said composition comprising:

an aqueous solution of a crosslinking compound which supplies ions of transition metals selected from the group consisting of zironium, hafnium, chromium, and titanium in a crosslinking time controller elected from polyamine crosslinking rate accelerators which control the rate at which said crosslinking compound promotes crosslinking of the said polysaccharide.

2. The composition of matter of claim 1, wherein said hydratable polysaccharide is selected from the group consisting of guar gum, hydroxypropyl guar, cationically substituted guar, carboxymethyl hydroxypropyl guar, hydroxybutyl guar, carboxymethyl cellulose, carboxymethyl hydroxyethyl cellulose, and hydroxyethyl cellulose.

3. The composition of matter of claim 1, wherein the said hydratable polysaccharides are present in the said aqueous liquid in concentrations ranging from about 0.30 percent to about 2.00 percent by weight of the aqueous liquid.

4. The composition of matter of claim 1, wherein said ions of transition metals are complexed with compounds selected from the group consisting of $\beta$-diketo compounds, alkanolamines, hydroxylamines, ethoxylated alcohols, lactones and polyacrylic acids.

5. The composition of matter of claim 1, wherein said polyamine is selected from the group consisting of tetramethylenediamine, triethylenetetramine, tetraethylenepentamine, diethylenetriamine, triethylenediamine, triethylenepentamine, ethylenediamine, N, N'-diethyl ethylene diamine, 1,5,9,13-tetraazotridecane, 1,5,8,12-tetraazododecane, and hexamethylenediamine, N, N'-diethyl-1,4-pentanediamine.

6. A method of controlling the crosslinking reaction of an aqueous fracturing fluid in fracturing of subterranean formations which comprises:

mixing in an aqueous solution a polysaccharide gelling agent, a crosslinking compound which supplies ions of transition metals consisting of the group consisting of zirconium, hafnium, chromium, and titanium and a crosslinking rate controller elected from polyamine crosslinking rate accelerators to control the rate at which said crosslinking compound crosslinks with the polysaccharide gelling agent.

7. The method of claim 6, wherein said fracturing fluid contains hydratable polysaccharides selected from the group consisting of guar gum, hydroxypropyl guar, cationically substituted guar, carboxymethyl hydroxypropyl guar, hydroxybutyl guar, carboxymethyl cellulose, carboxymethyl hydroxyethyl cellulose, and hydroxyethyl cellulose.

8. The method of claim 6, wherein the said hydratable polysaccharides are present in the said aqueous liquid in concentrations ranging from about 0.30 percent to about 2.00 percent by weight of the aqueous liquid.

9. The method of claim 6, wherein the aqueous liquid is water containing at least one of the following additives: alcohols, surfactants, biocides, pH control agents, oxygen scavengers and salts.

10. The method of claim 6, wherein said ions of transition metals are complexed with compounds selected from the group consisting of $\beta$-diketo compounds, alkanolamines, hydroxylamines, ethoxylated alcohols, lactones and polyacrylic acids.

11. The method of claim 10, wherein said complex ion is present in the range from about about 0.005 to in excess of about 0.500% by volume of the aqueous liquid/polysaccharide mixture.

12. The method of claim 6, wherein said polyamine is selected from the group consisting of tetramethylenediamine, triethylenetetramine, tetraethylenepentamine, diethylenetriamine, triethylenediamine, triethylenepentamine, ethylenediamine, N, N'-diethyl ethylene diamine, 1,5,9,13-tetraazotridecane, 1,5,8,12-tetraazododecane, and hexamethylenediamine, N, N'-diethyl-1,4-pentanediamine.

13. The method of claim 12, wherein the loadings of crosslinking rate accelerators range from about 0.001 to in excess of about 0.6 percent by volume of the aqueous liquid/polysaccharide mixture.

14. The method of claim 6, wherein said crosslinking compound and said crosslink time controller is simultaneously, yet independently, added to the fracturing fluid during pumping of the fracturing fluid into a well bore.

15. The method of claim 6, wherein said crosslinking compound and said crosslink time controller are mixed and added as a blend to the fracturing fluid during pumping of the fracturing fluid into a well bore.

16. The method of claim 6, wherein said crosslink time controller is mixed with the fracturing fluid prior to the addition of the crosslinking compound.

17. The method of claim 6, wherein the quantity of said crosslink time controller mixed with the fracturing fluid is adjusted such that crosslinked gel viscosity is achieved within a desired span of time.

18. The method of claim 17, wherein said crosslinked gel viscosity ranges from about 5,000 to in excess of 100,000 centipoise.

* * * * *